US011461504B2

(12) United States Patent
Kurd et al.

(10) Patent No.: US 11,461,504 B2
(45) Date of Patent: Oct. 4, 2022

(54) APPARATUS FOR AUTONOMOUS SECURITY AND FUNCTIONAL SAFETY OF CLOCK AND VOLTAGES INCLUDING ADJUSTMENT OF A DIVIDER RATIO

(71) Applicant: Intel Corporation, Santa Clara, CA (US)

(72) Inventors: Nasser Kurd, Portland, OR (US); Praveen Mosalikanti, Portland, OR (US); Thripthi Hegde, Beaverton, OR (US); Mark Neidengard, Beaverton, OR (US); Vaughn Grossnickle, Beaverton, OR (US); Qi S. Wang, Portland, OR (US); Kandadai Ramesh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/087,414

(22) Filed: Nov. 2, 2020

(65) Prior Publication Data
US 2021/0049307 A1 Feb. 18, 2021

Related U.S. Application Data

(63) Continuation of application No. 16/020,918, filed on Jun. 27, 2018, now Pat. No. 10,824,764.

(51) Int. Cl.
*G06F 21/70* (2013.01)
*H03K 5/24* (2006.01)
(Continued)

(52) U.S. Cl.
CPC ............... *G06F 21/70* (2013.01); *G06F 1/06* (2013.01); *G06F 1/28* (2013.01); *H03K 5/24* (2013.01);
(Continued)

(58) Field of Classification Search
CPC .......... G06F 21/70; G06F 21/71; G06F 21/81; G06F 1/28; G06F 1/06
See application file for complete search history.

(56) References Cited

U.S. PATENT DOCUMENTS 5,930,294 A 7/1999 Chapman
9,354,690 B1 5/2016 Joffe et al.
(Continued)

OTHER PUBLICATIONS

International Search Report and Written Opinion from PCT/US2019/034213 dated Sep. 9, 2019, 13 pgs.
(Continued)

*Primary Examiner* — Raymond N Phan
(74) *Attorney, Agent, or Firm* — Schwabe, Williamson & Wyatt, P.C.

(57) ABSTRACT

An apparatus is provided for autonomous security and functional safety (FUSA) of clock and voltages. The apparatus may include: a multiplexer having a first input communicatively coupled to a pin to receive a first clock external to a die, and a second input coupled to an output of a divider; an oscillator to provide a second clock; and a counter coupled to an output of the multiplexer and the oscillator, wherein the counter is to operate with the second clock and is to determine a frequency of the first clock. The apparatus may further include a voltage monitor circuitry for monitoring voltage(s) for FUSA, a reference generator for FUSA, a duty cycle monitor for FUSA, a frequency degradation monitor for FUSA, and a phase error degradation monitor for FUSA.

21 Claims, 12 Drawing Sheets

(51) Int. Cl.
  *H03K 21/08* (2006.01)
  *G06F 1/28* (2006.01)
  *G06F 1/06* (2006.01)
  *H03L 7/093* (2006.01)
  *H03L 7/099* (2006.01)

(52) U.S. Cl.
  CPC .............. *H03K 21/08* (2013.01); *H03L 7/093* (2013.01); *H03L 7/099* (2013.01)

(56) References Cited

U.S. PATENT DOCUMENTS

| | | | |
|---|---|---|---|
| 10,419,005 B2 * | 9/2019 | Shen | H03L 7/0802 |
| 10,746,797 B1 * | 8/2020 | Parekhji | G01R 31/31727 |
| 2004/0012415 A1 * | 1/2004 | Kouzuma | G04G 3/02 |
| | | | 327/113 |
| 2011/0280109 A1 | 11/2011 | Raymond | |
| 2015/0241553 A1 | 8/2015 | Gehrels et al. | |
| 2016/0192101 A1 * | 6/2016 | Park | H04R 29/007 |
| | | | 381/55 |
| 2017/0017258 A1 | 1/2017 | Park et al. | |
| 2018/0191358 A1 | 7/2018 | Wang et al. | |
| 2018/0241312 A1 * | 8/2018 | Cha | H02M 3/1588 |

OTHER PUBLICATIONS

Non-Final Office Action from U.S. Appl. No. 16/020,918 dated Nov. 29, 2019, 16 pgs.
Notice of Allowance from U.S. Appl. No. 16/020,918 dated Jun. 12, 2020, 5 pgs.
International Preliminary Report on Patentability from PCT/US2019/034213 dated Jan. 7, 2021, 10 pgs.

* cited by examiner

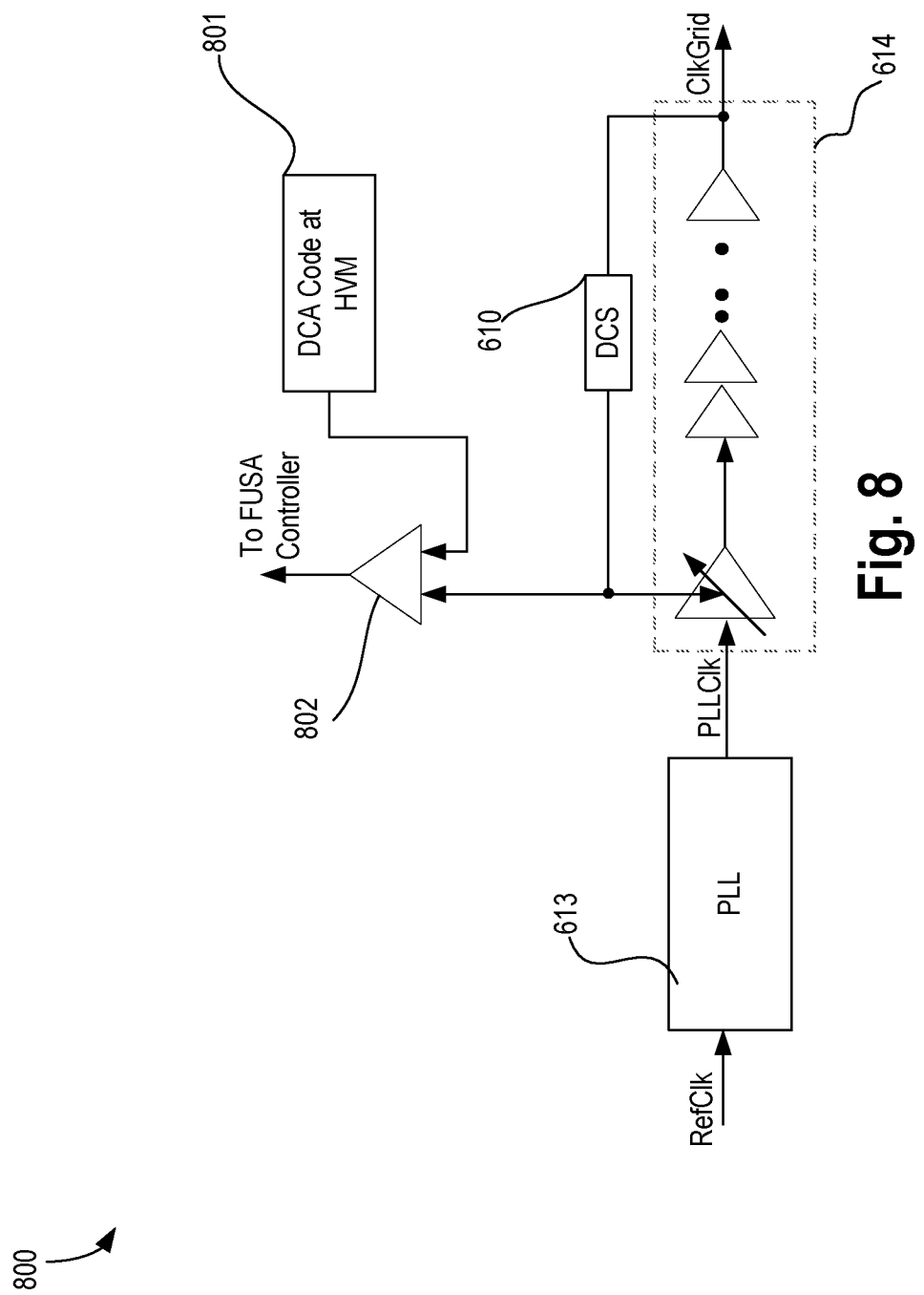

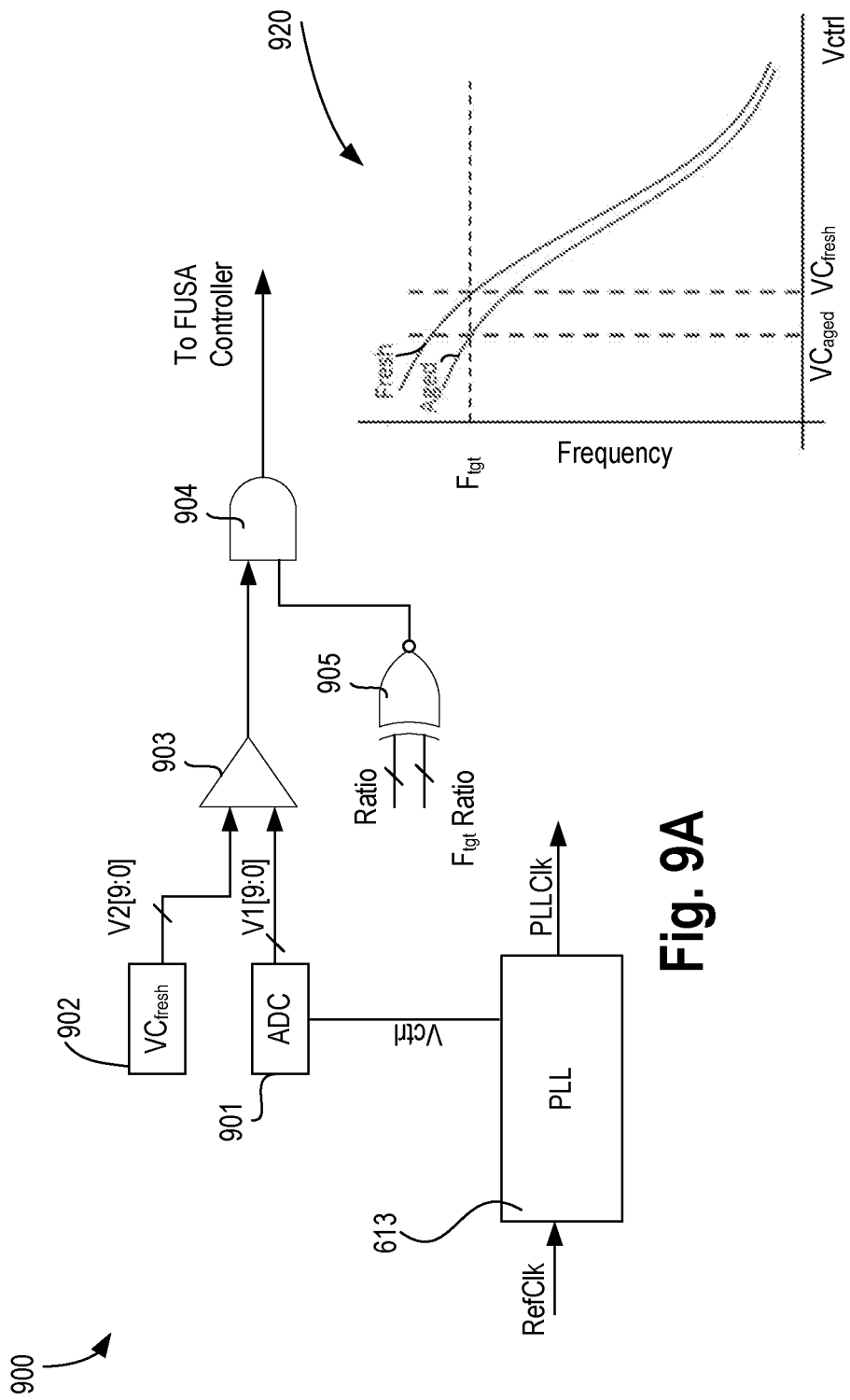

APPARATUS FOR AUTONOMOUS SECURITY AND FUNCTIONAL SAFETY OF CLOCK AND VOLTAGES INCLUDING ADJUSTMENT OF A DIVIDER RATIO

CLAIM FOR PRIORITY

This application is a continuation of, and claims priority to, U.S. patent application Ser. No. 16/020,918, filed Jun. 27, 2018, entitled "APPARATUS FOR AUTONOMOUS SECURITY AND FUNCTIONAL SAFETY OF CLOCK AND VOLTAGES," which is incorporated by reference in its entirety.

BACKGROUND

Security of hardware and software is paramount as computing devices (e.g., laptop, tablet, smart phone, computers, servers, internet-of-things, etc.) become the daily fabric of users. Signals on the physical pins of processor can be manipulated to cause the processor to perform an unintended function. For example, data stored in a non-volatile memory for internal use of the processor may be retrieved by unauthorized users using different signals on the pins of the processor. Likewise, software executing on the processor may cause the hardware of the processor to perform unauthorized functions (e.g., lowering the divider ratio of a phase locked loop). While many efforts have been made to mitigate and/or remove software viruses from computing devices, hardware largely remains unprotected for a sophisticated hacker.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 8 illustrates a duty cycle monitor for FUSA, in accordance with some embodiments.

FIG. 9A-B illustrate a frequency degradation monitor for FUSA, and a plot that shows aging impact, respectively, in accordance with some embodiments.

DETAILED DESCRIPTION

Figure 1:
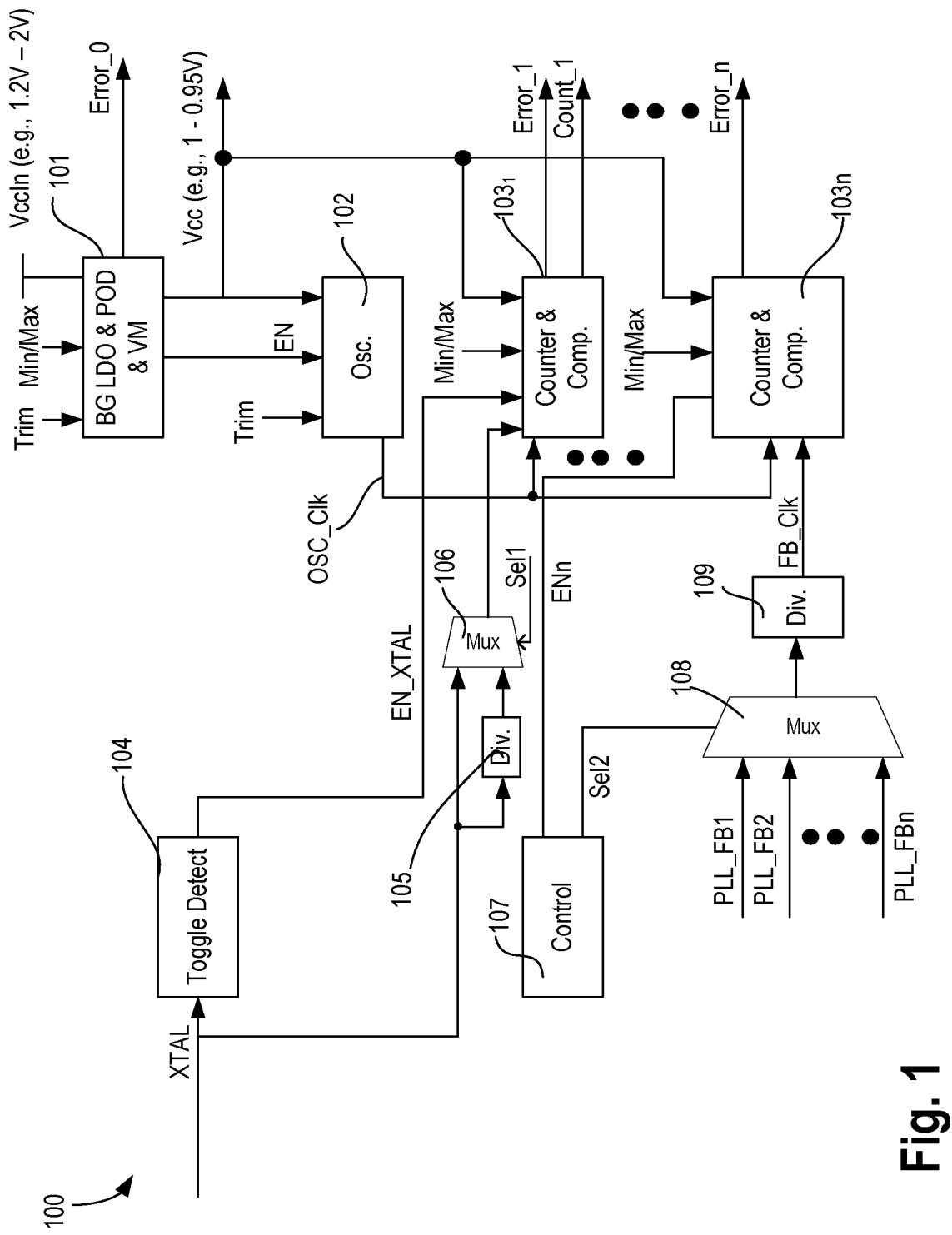
FIG. 1 illustrates a high level architecture of clock and voltage monitors for providing functional safety (FUSA) to a processor, according to some embodiments of the disclosure.

Various embodiments describe a method and apparatus for monitoring continuously and accurately all the external and internal clock frequencies of interest to meet stringent security and functional safety (FUSA) requirements. In some embodiments, the apparatus for FUSA autonomously monitors external voltage and clocking parameters prior to boot or fuse down loads. For example, independent from any trimming or calibration of various circuits, the apparatus monitors external voltage and clocking parameters to identify and flag any unexpected change to the external voltage and clocking parameters. In some embodiments, a combined voltage/clock accurate monitors are provided for security and functional safety in one integrated solution.

Some embodiments provide monitors that continuously track clock frequencies and voltages of interest and report errors to one or more functional and security controllers if and when minimum and maximum thresholds are exceeded. These thresholds can be preprogrammed per product or programmable at a later stage. In some embodiments, a very narrow frequency range oscillator (e.g., inductor-capacitor (LC) high frequency tank) is provided which delivers a stable clock to accurately monitor and/or sample external and/or internal clocks. In some embodiments, a toggle monitor is provided which detects when an external clock toggles to engage the monitors. In some embodiments, voltage reference generators (e.g., bandgap (BG) circuitry) and voltage regulators (e.g., low dropout regulator) are provided to independently generate internal voltages needed by the FUSA monitors. In some embodiments, the voltage reference generators and voltage regulators support a wide input supply voltage range. A built-in power-on detector (POD) is also provided to enable power supply voltage and reference voltage generation. In some embodiments, voltage monitor constantly tracks voltage and reports any variations from set thresholds. In one such embodiment, for security, hardware defaults are used prior to fuse down loads, and trimming or calibration codes for various circuitries for functional safety can be applied prior to enabling the trimming or calibration procedures.

In some embodiments, some or all anomalies found by the monitors (e.g., overclocking, change in frequency of an external reference clock, change in supply voltage etc.) can be mitigated by readjusting circuit parameters of downstream circuits and logic. For example, if the frequency of the external clock changes, the corresponding phase locked loop (PLL) may not generate the correct clock. To fix that, the external clock frequency is determined, and appropriate change to the PLL divider ratio is made to that the PLL output clock remains at its expected frequency.

In some embodiments, apparatus is provided for monitoring feedback clocks of phase locked loops (PLLs). In some embodiments, the feedback clocks are divided in frequency by a divider prior to monitoring those clocks to increase the accuracy of the monitor. While some embodiments are described with reference to monitoring feedback clocks for PLLs, any clocks with known frequencies set by known reference clock frequencies can be monitored. In some embodiments, a FUSA controller is provided which rotates which clocks to monitor from among several clocks of interest while avoiding the replication of high speed counters/logic. In some embodiments, the monitors are used for HVM (high volume monitoring) with BIST (built-in self-test) to internally change PLL clock divider ratios after specified lock timer. For example, the monitors of various embodiments are used to test HDMI 300+ frequencies for accuracy, and this significantly reduces test time.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

FIG. 1 illustrates a high level architecture 100 of clock and voltage monitors for providing functional safety (FUSA) to a processor, according to some embodiments of the disclosure. In some embodiments, architecture 100 for FUSA comprises a bandgap (BG) circuit, low dropout (LDO) regulator, power-on detector (POD), and voltage monitor (VM) together lumped in box 101; oscillator (e.g., LC tank oscillator) 102; a plurality of counters and comparators $103_{1-n}$ (where 'n' is an integer greater than 1); toggle detector 104; divider 105, multiplexer 106, controller 107, multiplexer 108, and divider 109. In some embodiments, toggle detector 104, controller 107, and other circuitries that control the process of providing FUSA are part of a FUSA controller.

In some embodiments, POD of block 101 detects the voltage on VccIn power supply rail (e.g., 1.2V to 2V) and compares the voltage with a minimum (Min) threshold and a maximum (Max) threshold. One possible implementation of the POD is illustrated with reference to FIG. 11. Referring back to FIG. 1, in some embodiments, bandgap (BG) circuit of block 101 generates a reference voltage which is used as a reference voltage for one or more voltage monitors and the LDO. In some embodiments, voltage monitor(s) constantly track voltage of VccIn and report any variations from set thresholds. For security, hardware defaults for the thresholds are used prior to fuse downloads. In some embodiments, trimming codes (trim) or calibration codes for functional safety can be applied to the BG circuit prior to enabling. In some embodiments, the voltage monitors (VMs) in block 101 compare the supply voltage VccIn with known minimum (min) and maximum (max) thresholds. If and when VccIn voltage level is outside the min/max thresholds, an error signal is generated (e.g., Error_0 is asserted). One possible architecture of using BG circuit with a voltage regulator is described with reference to FIG. 5.

Referring back to FIG. 1, in some embodiments, a narrow range oscillator 102 is used to provide an oscillation clock OSC_Clk for various logics of architecture 100. For example, oscillation clock OSC_Clk is provided to counters and/or comparators $103_{1-n}$ for counting edges seen within a specific (or programmable) time window. In some embodiments, the narrow range oscillator 102 comprises an LC-Tank with a default mid-coarse band and fine codes that together have an entire range less than, for example, +/−400 MHz. One possible architecture of an LC-Tank is illustrated with reference to FIG. 3.

Referring back to FIG. 1, in some embodiments, counters $103_{1-n}$ are used to sample the input clock OSC_Clk for a time window determined by a certain number of cycles of the input clock (e.g., a version of XTAL, a selected feedback clock FB_Clk). The primary accuracy of the counters is set by the nominal frequency of the sampled clock and the meta-stability of its flip-flops, and weakly sensitive to the variation in the LC-tank frequency OSC_Clk.

In some embodiments, Toggle Detector (or monitor) 104 detects when the external clock XTAL toggles and then autonomously engage XTAL or other reference monitors. For example, Toggle Detector 104 comprises an edge detection circuit that identifies when a transition (e.g., low-to-high or high-to-low) is observed for the XTAL clock. XTAL clock may be an off-die clock generated by a crystal, for example.

In various embodiments, Toggle Detector 104 is on die, and is communicatively coupled to a pin which receives the external clock XTAL. In some embodiments, when Toggle detector 104 identifies a transition in the XTAL clock, it generates an enable signal EN_XTAL. The enable signal EN_XTAL is used to enable the counters and comparators that begin to count the frequency of XTAL and compare the counted frequency with a minimum (min) and/or maximum (max) threshold frequency number. The output from each counter & Comp. Block $103_{1-n}$ is a count value (e.g., Count_1 from block $103_1$) and an error indicator (e.g., Error_1 from block $103_1$) indicating that the frequency count value is out of bounds from the minimum or maximum expected count values. Here, for security, fixed XTAL/references are used for FUSA. For example, straps or fuses can be used to pre-define the min/max thresholds if multiple XTAL/reference frequencies are supported.

To increase the accuracy of the counter 1031-n, the input clock is divided down in frequency. In some embodiments, a divider 105 is used to divide down the frequency of the XTAL clock. The divided down frequency is then provided to a multiplexer (Mux.) 106 which provides one of XTAL clock or divided down XTAL clock (according to select signal Sel1) for counter $103_1$. In some embodiments, a controller (not shown) provides the Sel1 signal. This controller is also referred to as the FUSA controller. Mux 106 allows the flexibility to count the frequency of XTAL directly or in divided form.

In some embodiments, one of the counters (e.g., $103_n$) counts the frequency of one of several PLL feedback clocks (PLL_FB1 through PLL_FBn). PLL feedback clocks PLL_FB1 through PLL_FBn have known or fixed frequencies derived from their respective divider ratios. Like in the case of XTAL clock, multiplexer 108 and divider 109 are provided to select one of the feedback clocks and to divide down its frequency to generate FB_Clk for counter $103_n$ to count more accurately. Generally, the higher the divider ratio the better the clock monitor accuracy. In some embodiments, controller 107 (e.g., part of the FUSA controller) is provided which can rotate which clock from among PLL_FB1 through PLL_FBn to monitor sequentially with knowledge of each clock and state transition to mask errors during frequency transitions. This solution of clock rotation may not need to know actual divider ratio given the feedback clocks of the PLLs have constant frequency regardless of PLL divider ratio. The counter $103n$ is enabled by ENn when FB_Clk is available to count. In various embodiments, this enable signal ENn is asserted by controller 107 when controller 107 detects a toggling FB_Clk or toggling of one, some, or all of clocks PLL_FB1 through PLL_FBn.

Figure 2:
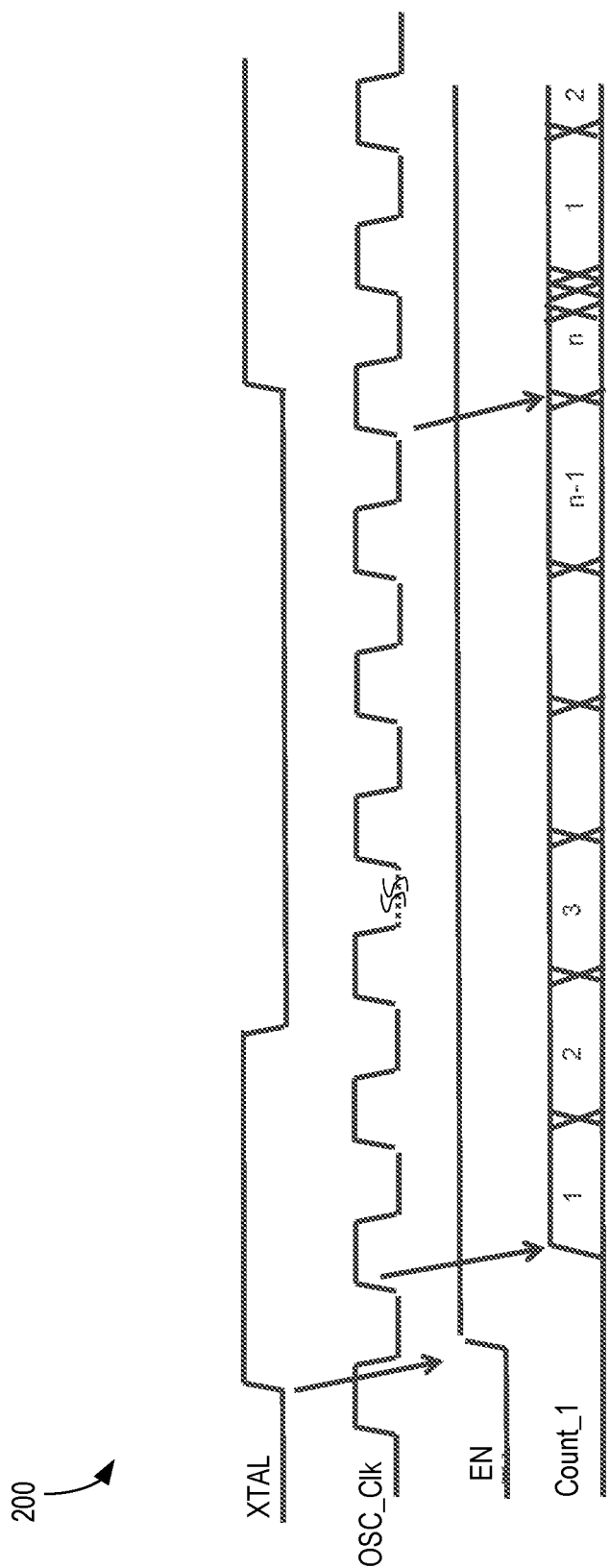
FIG. 2 illustrates a plot showing a timing diagram of the high level architecture, in accordance with some embodiments.

FIG. 2 illustrates plot 200 showing a timing diagram of the high level architecture, in accordance with some embodiments. Plot 200 shows four waveforms—XTAL, OSC_Clk, EN, and Count_1 as examples to show operation of architecture 100. When Toggle Detector 104 detects a transition in XTAL clock, the enable signal EN is asserted. Once EN is asserted, counter $103_1$ begins to count the frequency of the edges of OSC_Clk between its two rising edges. The value of the counter is shown by Count_1, which is a multibit code.

Figure 3:
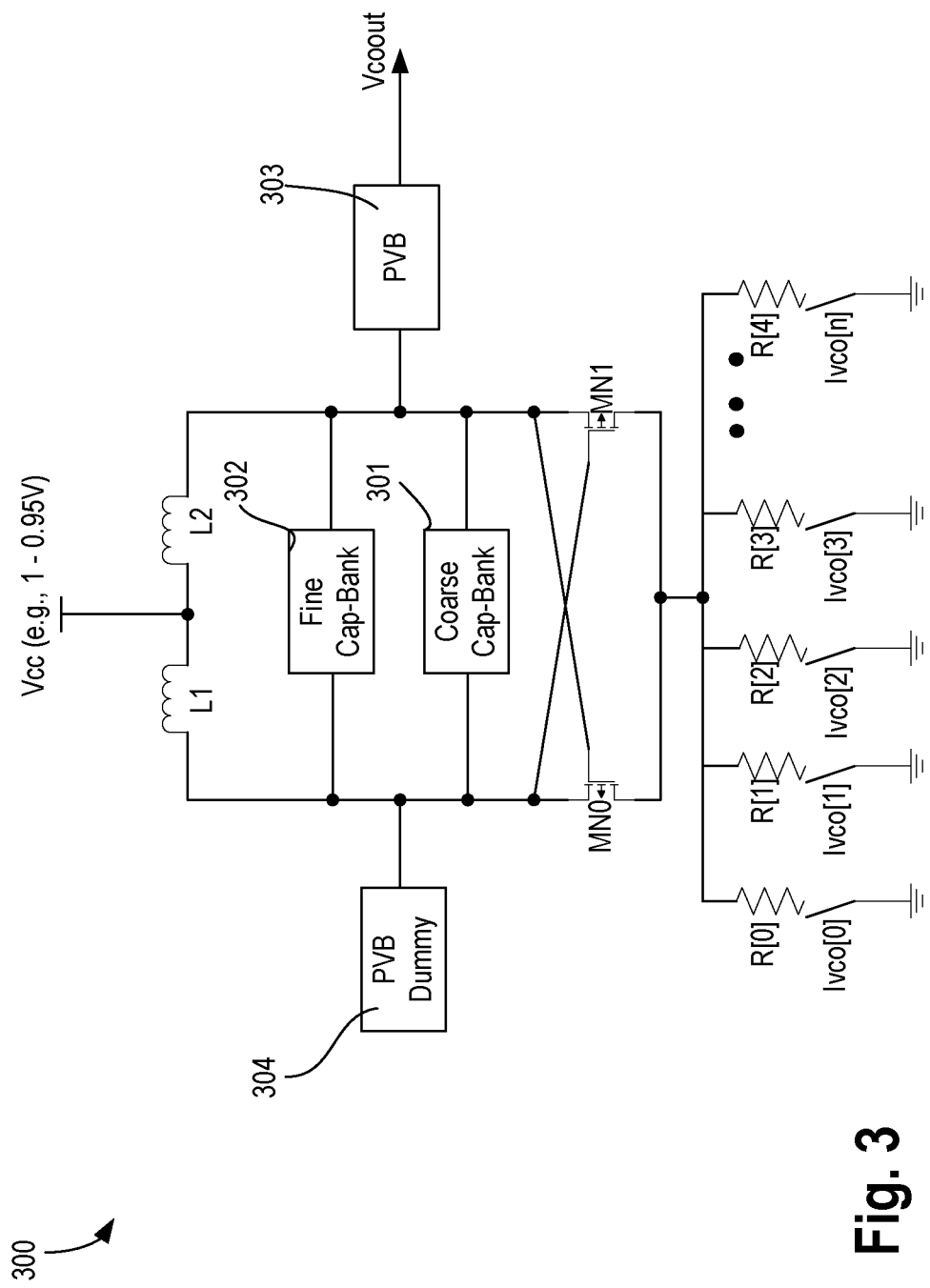
FIG. 3 illustrates a narrow range single frequency oscillator for monitoring frequency of a clock for FUSA, in accordance with some embodiments.

FIG. 3 illustrates a narrow range single frequency oscillator 300 (also referred to as LC-tank oscillator) for monitoring frequency of a clock for FUSA, in accordance with some embodiments. The LC-tank oscillator 300 comprises inductors L1 and L2 coupled in series and together in parallel to capacitors banks 301 and 302. In some embodiments, capacitor bank 301 is a coarse bank including capacitors that are binary weighted. In some embodiments, capacitor bank 302 is a fine bank including capacitors that are thermometer weighted. Here, coarse bank refers to a group of capacitors where each capacitor when added to the capacitance network increases the capacitance by much higher amount than when a capacitor from a fine bank is added to the capacitance network.

In some embodiments, n-type transistors MN0 and MN1 are cross-coupled and also coupled to the inductors L1 and L2, and capacitor banks 301 and 302 to cause the oscillation and also to control the oscillation frequency. In various embodiments, the oscillation amplitude can be tuned by switches controlled by Ivco[0] through Ivco[n] that add/subtract resistances R[0] through R[n] on the source of transistors MN0 and MN1. As such, bias current of the LC-tank oscillator is modified. In some embodiments, the output Vcoout of the LC-tank oscillator 300 is buffered by post VCO (voltage controlled oscillator) buffer (PVB) 303. To balance the LC-tank oscillator 300, a replica or dummy PVB 304 is also coupled to inductor L1 to provide same rise and fall times for the Vcoout clock. In various embodiments, Vcoout (e.g., OSC_Clk) is a stable clock which is used to accurately monitor or sample external and/or internal clocks.

Figure 4:
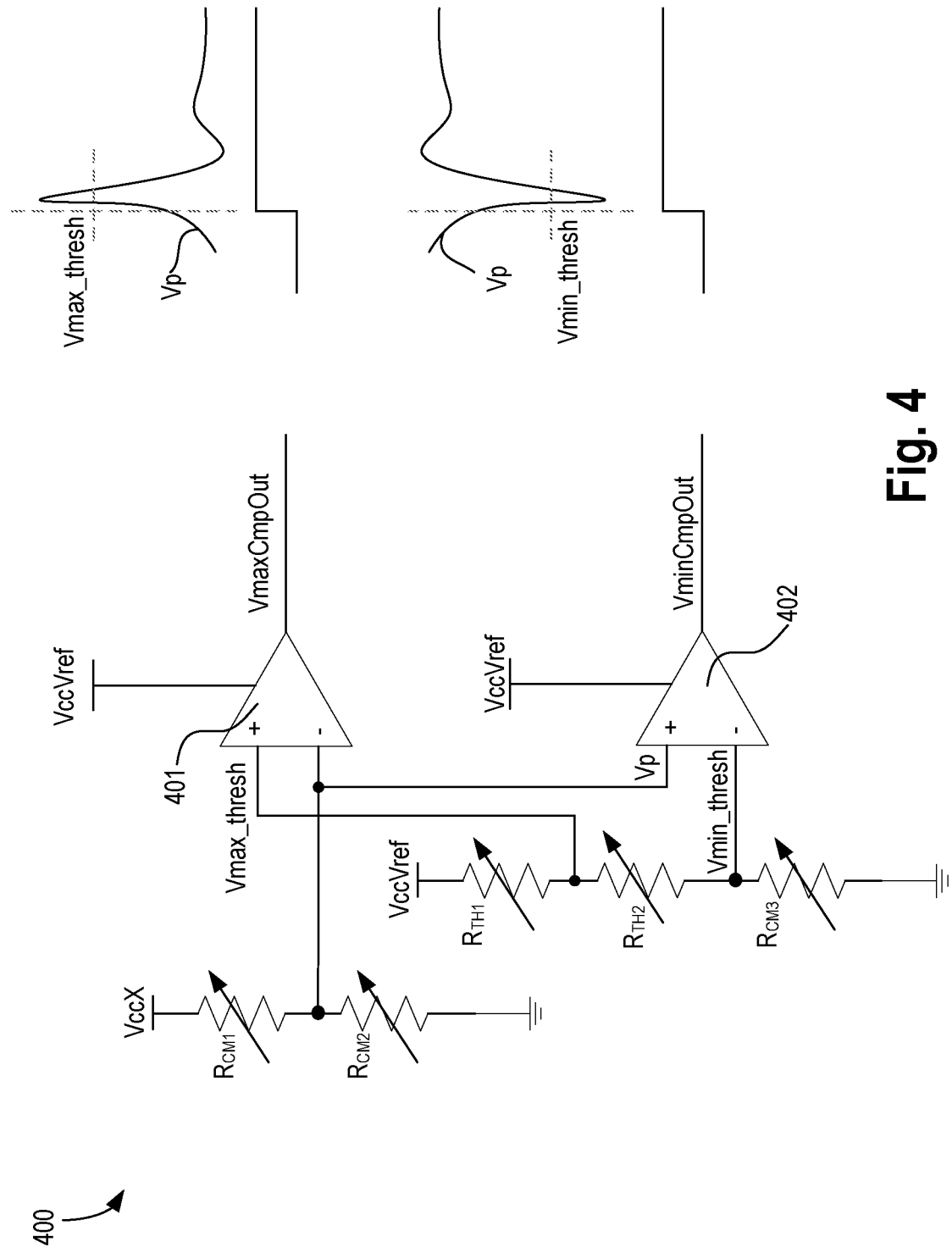
FIG. 4 illustrates a voltage monitor circuitry for monitoring voltage for FUSA, in accordance with some embodiments.

FIG. 4 illustrates a voltage monitor (VM) circuitry 400 for monitoring voltage for FUSA, in accordance with some embodiments. In some embodiments, VM circuitry 400 comprises a first comparator 401 and a second comparator 402. In some embodiments, the output VmaxCmpOut and VminCmpOut from first comparator 401 and second comparator 402, respectively, are sticky outputs. For example, when the signals on nodes VmaxCmpOut and VminCmpOut changes, those signals are latched and remain at those logic states. In some embodiments, first comparator 401 and second comparator 402 are clocked comparators. Any suitable clocked comparator can be used for implementing first comparator 401 and second comparator 402.

In various embodiments, the power supply VccRef to the comparators 401/402 is provided by a low dropout (LDO) regulator circuitry discussed with reference to FIG. 5. Referring back to FIG. 4, here, first comparator 401 compares a divided down version Vp of the power supply VccX with a high or maximum threshold Vmax_thresh. Second comparator 402 compares a divided down version Vp of the power supply VccX with a low or minimum threshold Vmin_thresh. As such, first comparator 401 monitors VccX with reference to a high threshold while second comparator 402 monitors VccX with reference to a low threshold. In some embodiments, the divided down version Vp of the power supply VccX is generated by a resistive ladder or voltage divider comprising resistive devices $R_{CM1}$ and $R_{CM2}$. In some embodiments, resistive devices $R_{CM1}$ and $R_{CM2}$ have adjustable resistances.

In some embodiments, the maximum threshold Vmax_thresh and the minimum threshold Vmin_thresh are generated by a resistive divider. In this example, a stack of three adjustable resistive devices $R_{TH1}$ through $R_{TH3}$ are used to provide maximum threshold Vmax_thresh and the minimum threshold Vmin_thresh. The resistive devices can be implemented in any suitable manner. For example, resistive devices can be implemented using discrete resistors, transistors operating in linear region, etc. These resistive devices can have adjustable resistances. By indicating when VccX is above or below an expected threshold, a processor can detect for any functional safety issues and take steps to mitigate that.

Figure 5:
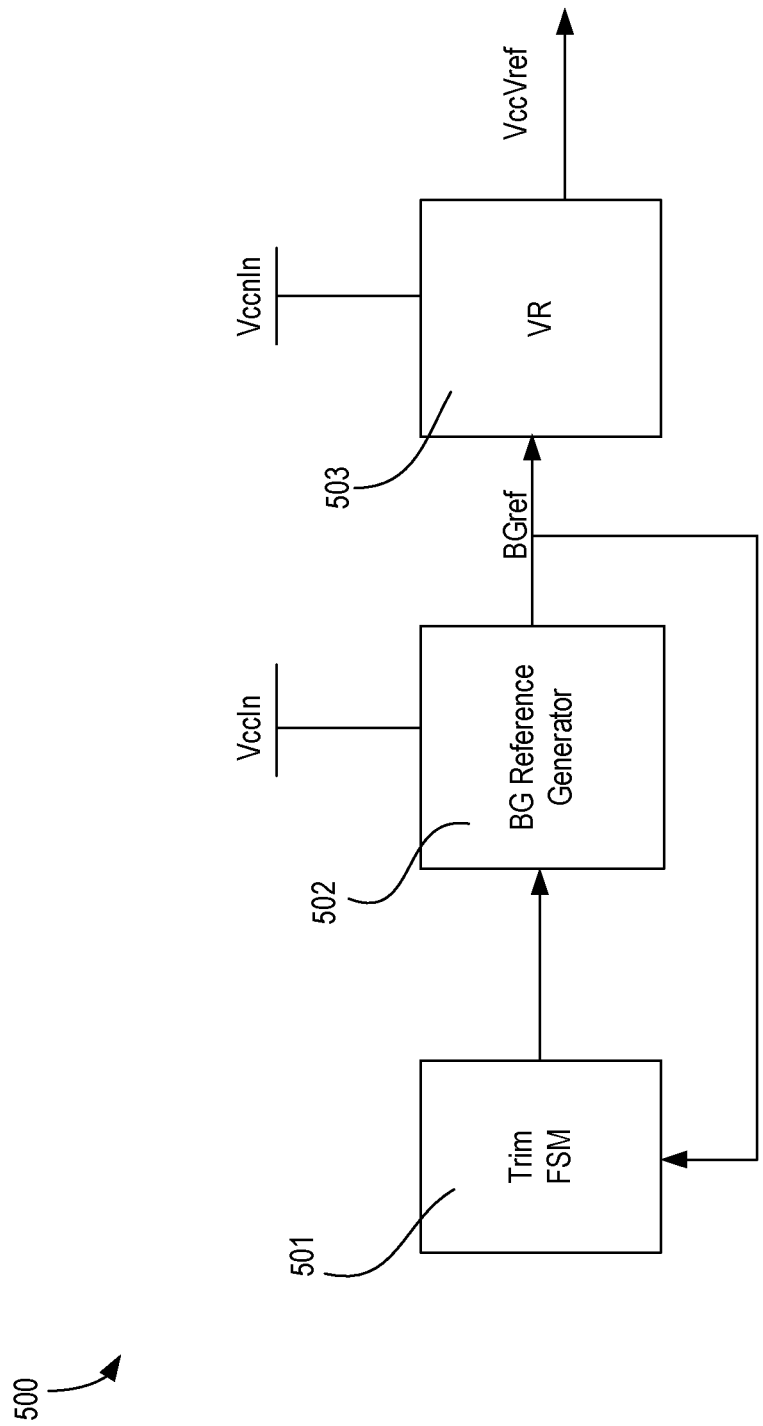
FIG. 5 illustrates a reference generator for FUSA, in accordance with some embodiments.

FIG. 5 illustrates a reference generator architecture 500 for FUSA, in accordance with some embodiments. In some embodiments, reference voltage supply VccVref for first comparator 401 and second comparator 402 can be provided by architecture 500 which comprises a finite state machine (FSM) 501, BG reference generator 502, and a low voltage regulator (VR) 503. In some embodiments, depending on the voltage value of BGref, FSM 501 calibrates the BG reference generator 502 by trimming one or more devices (e.g., adjusting current/voltage drive strength of devices) of BG reference generator 502 to get the level of the BGref to an expected level. In some embodiments, VR 503 is a low dropout (LDO) regulator which is powered by VccIn. Any suitable LDO regulator design can be used for implementing VR 503. In some embodiments, VR 503 may be a unity gain buffer. Any suitable unity gain buffer design can be used for implementing VR 503.

Figure 6:
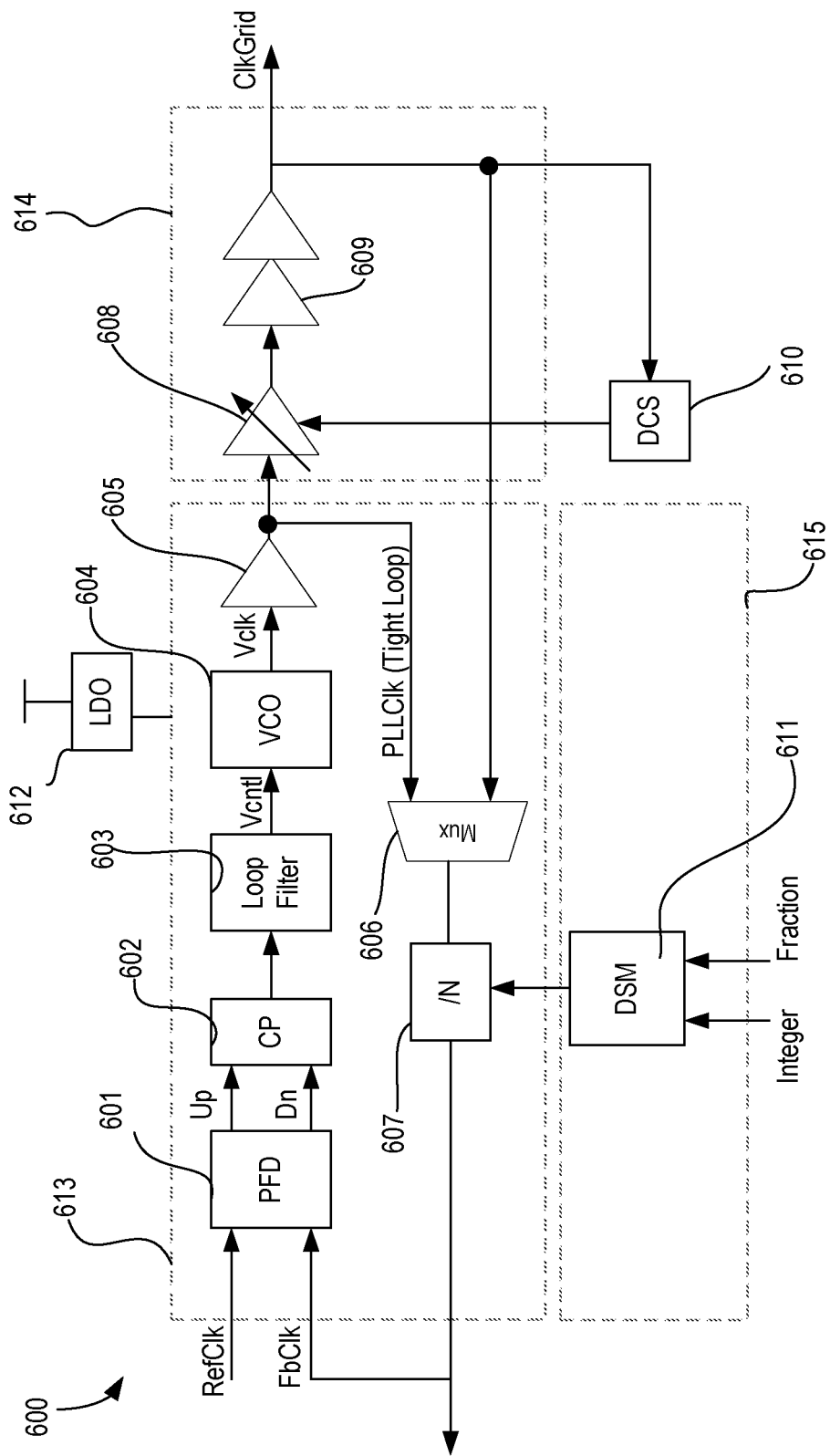
FIG. 6 illustrates a clocking architecture which is coupled to one or more performance monitoring circuitries to monitor FUSA, in accordance with some embodiments.

FIG. 6 illustrates a clocking architecture 600 which is coupled to one or more performance monitoring circuitries to monitor FUSA, in accordance with some embodiments. Architecture 600 comprises phase-frequency detector (PFD) 601, charge pump (CP) 602, loop filter or low pass filter (LPF) 603, voltage controlled oscillator (VCO) 604, post VCO buffer (PVB) 605, multiplexer 606, divider 607, duty cycle adjustment (DCA) circuitry 608, clock distribution buffers 609, duty cycle state machine 610, and delta-sigma modulator (DSM) 611. In some embodiments, various circuitries of clocking architecture 600 operate on different supplies which are indicated by domains 613, 614, and 615. In some embodiments, VCO receives a separate power supply from an LDO 612. In some embodiments, one or more CP 602, Loop Filter 603, VCO 604, PVB 605, Feedback Divider 607 and other devices/circuitries along the clock propagation path receives a separate power supply from LDO 612. The clocking architecture receives a reference clock (RefClk) such as XTAL or its derivative and this clock is received by PFD 601 which comprises the FBClk (e.g., one of PLL_FB1 through PLL_FBn). The output of PFD 601 are up and down (Dn) signals that instruct CP 602 to sink or source charge onto a control node. The voltage on the control node is then filtered by LPF 603 to generate Vcntl which controls the oscillation frequency of VCO 604. The output Vclk of VCO is buffered by 605 and provided to DCA circuitry 608. In some embodiments, one of the ClkGrid or PLLClk is selected as a clock by Mux 606 for input to divider 607. In some embodiments, divider 607 receives an integer ratio or fractional dividing ratio from DSM 611. In various embodiments, performance of functional safety of clocking architecture 600 is monitored by checking signals such as Up, Dn, duty cycle of ClkGrid, etc. A change in characteristics of Up, Dn, duty cycle of ClkGrid, from their expected characteristics can provide insight into functional safety hazard for clocking architecture 600. Here, clocking architecture 600 is a phase locked loop and is shown as an example architecture for FUSA monitoring. However, the techniques for FUSA monitoring can be applicable to any clocking architecture.

Figure 7:
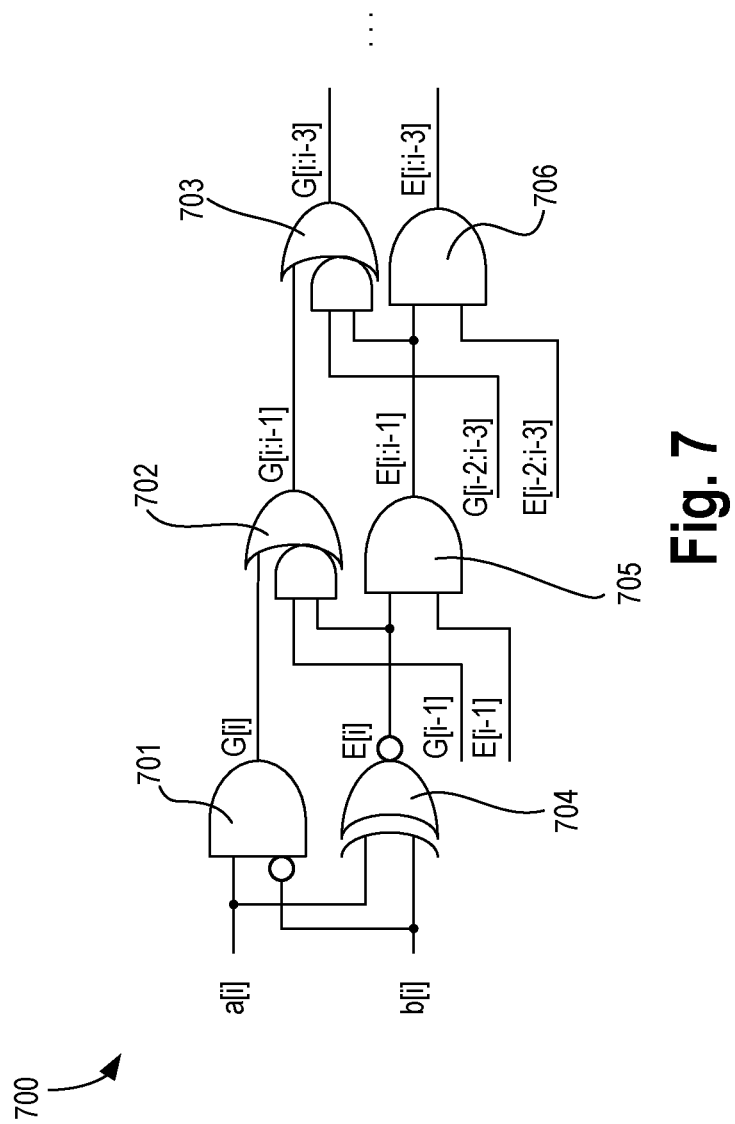
FIG. 7 illustrates a scalable comparator based on a parallel prefix tree architecture for providing FUSA, in accordance with some embodiments.

FIG. 7 illustrates a scalable comparator based on parallel prefix tree architecture 700 for providing FUSA, in accordance with some embodiments. In some embodiments, first and second comparators 401/402 are implemented using architecture 700. In some embodiments, comparator architecture 700 is a multibit comparator tree comprising NAND gate 701 and NOR gate 704 to compare inputs a[i] and b[i], followed by stages including complex logic 702 and AND gate 705, complex logic 703 and AND gate 706, and so on. Here, the first few stages of the multibit comparator tree are shown, whose first stage calculates whether single bits of binary word "a" are greater (G[i]) or equal to (E[i]) corresponding bits of "b". The remaining stages logarithmically combine the G and E bits of significance [i,i-j] with those of [i-j-1,i-k] to produce significance [i,i-k]. This fanin-2 depiction is an example; trees of fanin-3+ are possible, as are alternate comparison encodings (e.g., less-than instead of equal-to).

FIG. 8 illustrates a duty cycle monitor 800 for FUSA, in accordance with some embodiments. In some embodiments, duty cycle monitor comprises comparator 802 (e.g., based on architecture 700) which compares the duty cycle code from DCC (Duty Cycle Corrector) 610 with a predetermined code 801. The DCC senses duty cycle of the clock grid, in accordance with some embodiments. In some embodiments, the DCA codes are updated by DCC to minimize DCD. The output of comparator 802 is then provided to a FUSA controller. The FUSA controller may provide a report or an indicator about the health of the duty cycle and indicate when the duty cycle of the PLLClk is outside its expected range. For example, duty cycle monitor 800 can provide insight into duty cycle distortion (DCD) due to asymmetric aging of p-type vs. n-type devices. DCD can cause phase path timing violations and even pulse width evaporation.

FIG. 9A-B illustrate a frequency degradation monitor 900 for FUSA, and plot 920 that shows aging impact, respectively, in accordance with some embodiments. In some embodiments, frequency degradation monitor 900 comprises an analog-to-digital converter (ADC) which converts the VCO input control voltage Vctrl to a digital representation V1 (e.g., a 10-bit digital code V1[9:0]). In some embodiments, the original value ($Vc_{fresh}$) of Vctrl in digital code is stored in memory 902. This original value is the value of Vctrl for a given divider ratio at the time the product/die was manufactured and put to first use. The original value, V2 corresponding to $Vc_{fresh}$ is then compared with V1 (corresponding to $Vc_{aged}$) to determine how aging has impacted the performance of the PLL 613 and hence the FUSA. To enable determining shift in control voltage, Vctrl, for the same target frequency Ftgt, in some embodiments, the divider ratio used when $VC_{fresh}$ is generated and compared with a target frequency divider ratio before the output of comparator 902 is provided to the FUSA controller. For example, the output of comparator 902 is AND-ed with the output of XNOR gate 905 before the FUSA controller is informed about degradation in Vcntl over time.

Figures 10A, 10B:
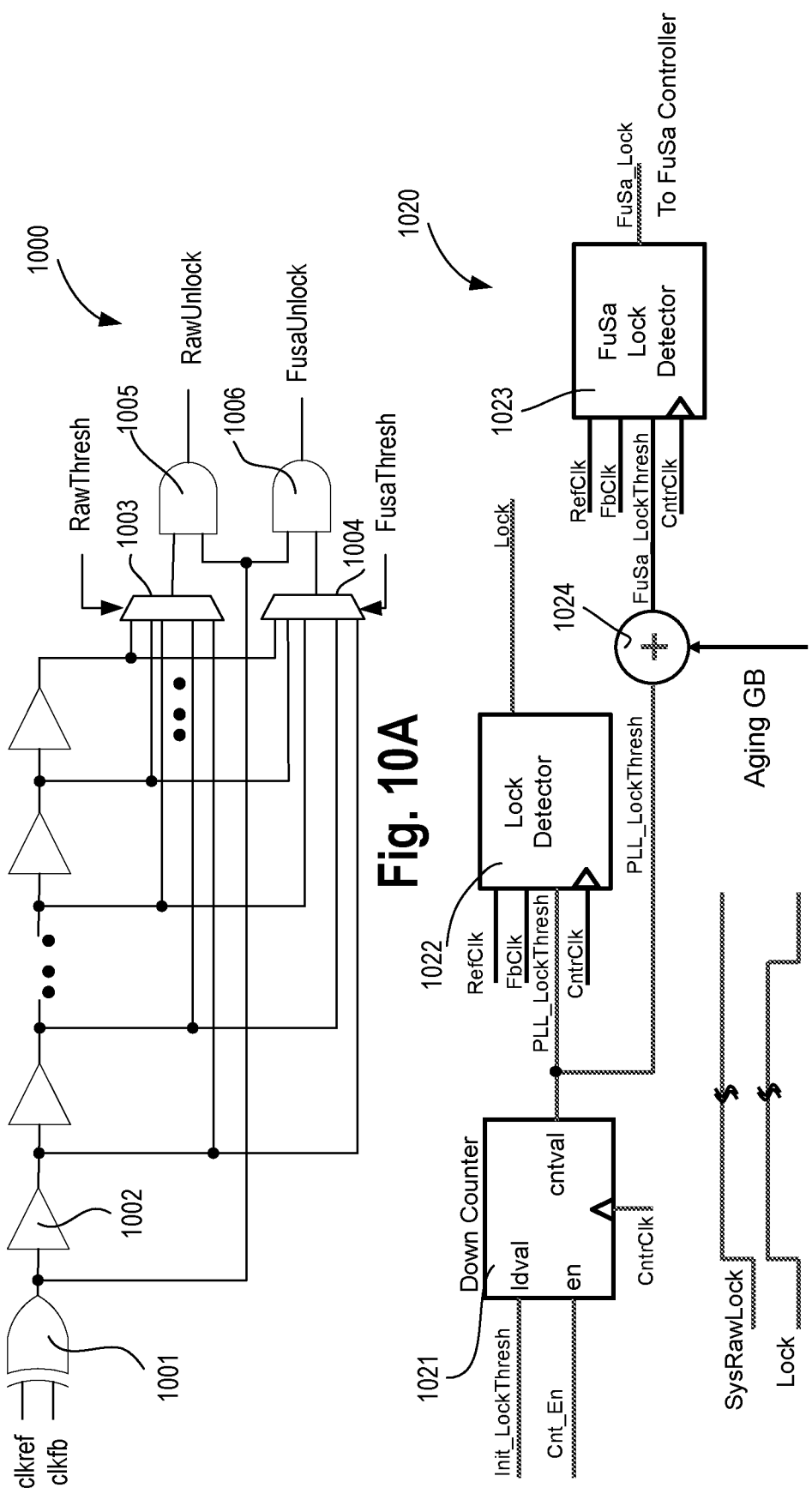
FIG. 10A illustrates circuitry to compare a reference clock with a feedback clock and to generate indicators of phase lock, in accordance with some embodiments.
FIG. 10B illustrates logic to determine phase error degradation for FUSA purposes, in accordance with some embodiments.

FIG. 10A illustrates circuitry 1000 to compare a reference clock with a feedback clock and to generate indicators of phase lock, in accordance with some embodiments. In some embodiments, circuitry 1000 comprises XOR gate 1001 followed by a chain of delay buffers 1002, multiplexers 1003 and 1004, and AND gates 1005 and 1006 coupled together as shown. The inputs to XOR gate 1001 are a reference clock (clkref) and feedback clock (clkfb). These clocks are compared and the output of the comparison (e.g., XOR gate 1001) is converted into pulses RawUnlock and FusaUnlock. Here, RawUnlock and FusaUnlock provide early indications of separation in phases of clkref and clkfb. In some embodiments, multiplexer 1003 is used to modify the threshold for indicating when the phases of clkfb and clkref are separated enough to call out a RawUnlock indication. This threshold can be modified by RawThresh. In some embodiments, multiplexer 1004 is used to modify the threshold for indicating when the phases of clkfb and clkref are separated enough to call out a FusaUnlock indication. This threshold can be modified by FusaThresh.

FIG. 10B illustrates logic 1020 to determine phase error degradation for FUSA purposes, in accordance with some embodiments. As devices of a clocking source (e.g., a PLL) age, the devices become slower and clocking sources may lose phase or frequency lock earlier than when the devices were newly manufactured. In some embodiments, logic 1020 is provided to monitor and alarm the locking degradation by indicating an early lock failure of the phase or frequency lock of the clocking source. This early indication (e.g., FUSA Lock) is provided to a FUSA controller that can modify the locking window of the lock detector associated with clocking sources so that the clocking sources do not declare unlocking of their system. The FUSA controller can further request a power or frequency management system to reduce clocking frequency requirements so that logics in a processor can have relaxed timing margins.

In some embodiments, logic 1020 comprises a down counter 1021, lock detector 1022, and a FUSA lock detector 1023. Here, lock detector 1022 and FUSA lock detector 1023 are replicas of the real lock detector of a clocking source. The down counter 1021 counts down from a maximum lock threshold (also referred to as initial (Init) lock threshold (Init_LockThresh) until Lock is de-asserted (e.g., there is no lock). In some embodiments, down counter 1021 also operates on OSC_clk (e.g., counter clock CntrClk is same as OSC_Clk or its divided down version). When Lock is de-asserted, true PLL phase error at time zero is determined. Here, Lock detector 1021 is any suitable lock detector circuitry that monitors the Up and Down pulses generated from a phase frequency detector (which compares reference clock RefClk and feedback FbClk). So long as the difference in Up and Down pulses is within a PLL_Lock-Thrshold (a lock threshold) for a predetermined time, Lock signal is asserted. When the difference between Up and Down pulses becomes larger than the PLL_LockThreshold, Lock signal de-asserts indicating loss of lock of the clocking source.

As the down counter 1021 counts down and reduces the PLL_LockThreshold value, Lock Detector 1022 window for justifying lock is squeezed till the Lock Detector declares a loss of Lock. When Lock de-asserts (e.g., when Lock signal indicates loss of lock), a reference or true PLL phase error at time zero is determined. In some embodiments, the value of PLL_LockThreshold that results in the Lock being de-asserted for a specific process, voltage, temperature condition is recorded in a non-volatile memory. Now that the reference PLL_LockThreshold is determined, aging guard band (GB) is added to the true PLL_LockThreshold value to account for aging-induced degradation. As such, a modified lock threshold FUSA_LockThresh is calculated which provides an early lock failure through FUSA_Lock signal to a FUSA controller. The FUSA controller can then take suitable steps to mitigate the phase error degradation (e.g., phase error between Clkref and Clkfb). Examples of suitable steps include reducing power supply voltage level, reducing frequency of operation by changing the divider ratio of the phase locked loop, etc.

Figure 11:
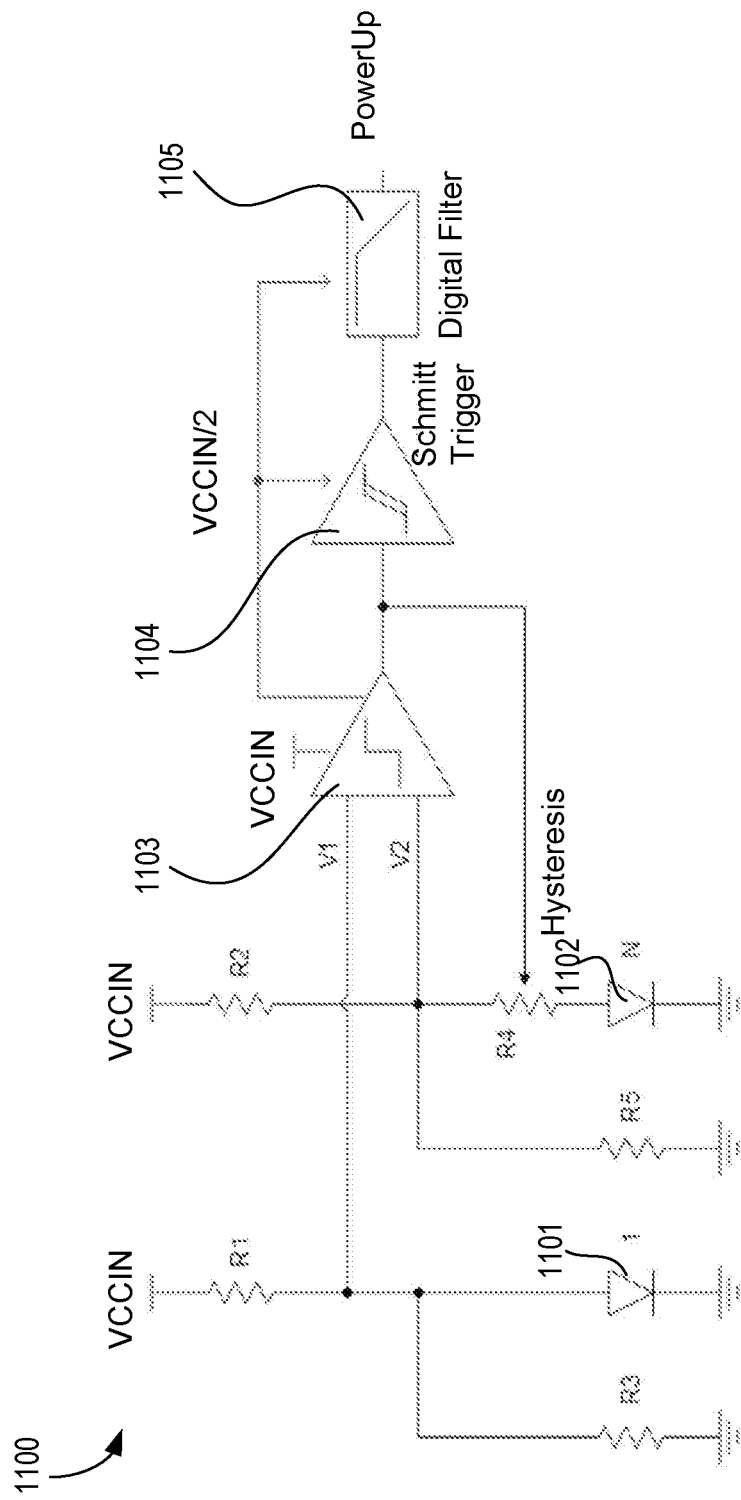
FIG. 11 illustrates power-up detector for the architecture of FIG. 1, in accordance with some embodiments.

FIG. 11 illustrates power-on detector (POD) 1100 used for FIG. 1, in accordance with some embodiments. In some embodiments, POD 1100 comprises a bandgap reference circuit including resistors R1, R2, R3, R4, and R5, diodes 1101 and 1102, Schmitt Trigger buffer 1104, and Digital Filter 1105 coupled together as shown. Here, VCCIN is the input power supply which is being monitored to see whether it is high enough to be "good" for usage. The indicator PowerUp when asserted indicates that VCCIN is high enough to be used by other logic and circuits. For example, PowerUp is used to enable or disable a functional safety or security test operation.

Diode 1102 is N times larger than diode 1101, and so the current through R2 is N times larger (minus the current R5) than the current through RE The voltages V1 and V2 associated with the two resistors R1 and R2 are compared by comparator 1103. The output of comparator 1103 is converted to a signal operating on VCCIN/2 (e.g., half of VCCIN) and provided to Schmitt Trigger 1104. When the power supply VCCIN crosses a threshold, the output of Schmitt Trigger 1104 toggles, which indicates a possible power good. The output of Schmitt Trigger 1104 is filtered by digital filter 1105 to ensure a correct power up indication. The PowerUp indicator is then used the FUSA controller to enable other FUSA circuitries to being monitoring various characteristics (e.g., clock frequency, voltages, duty cycle, phase error, etc.).

The various clock and voltage monitors of various embodiments are basic ingredients to hardware safety and secure products. The various security monitors provide near real-time or real-time autonomous responses. The FUSA monitors track the change in clocks and voltages in time.

Figure 12:
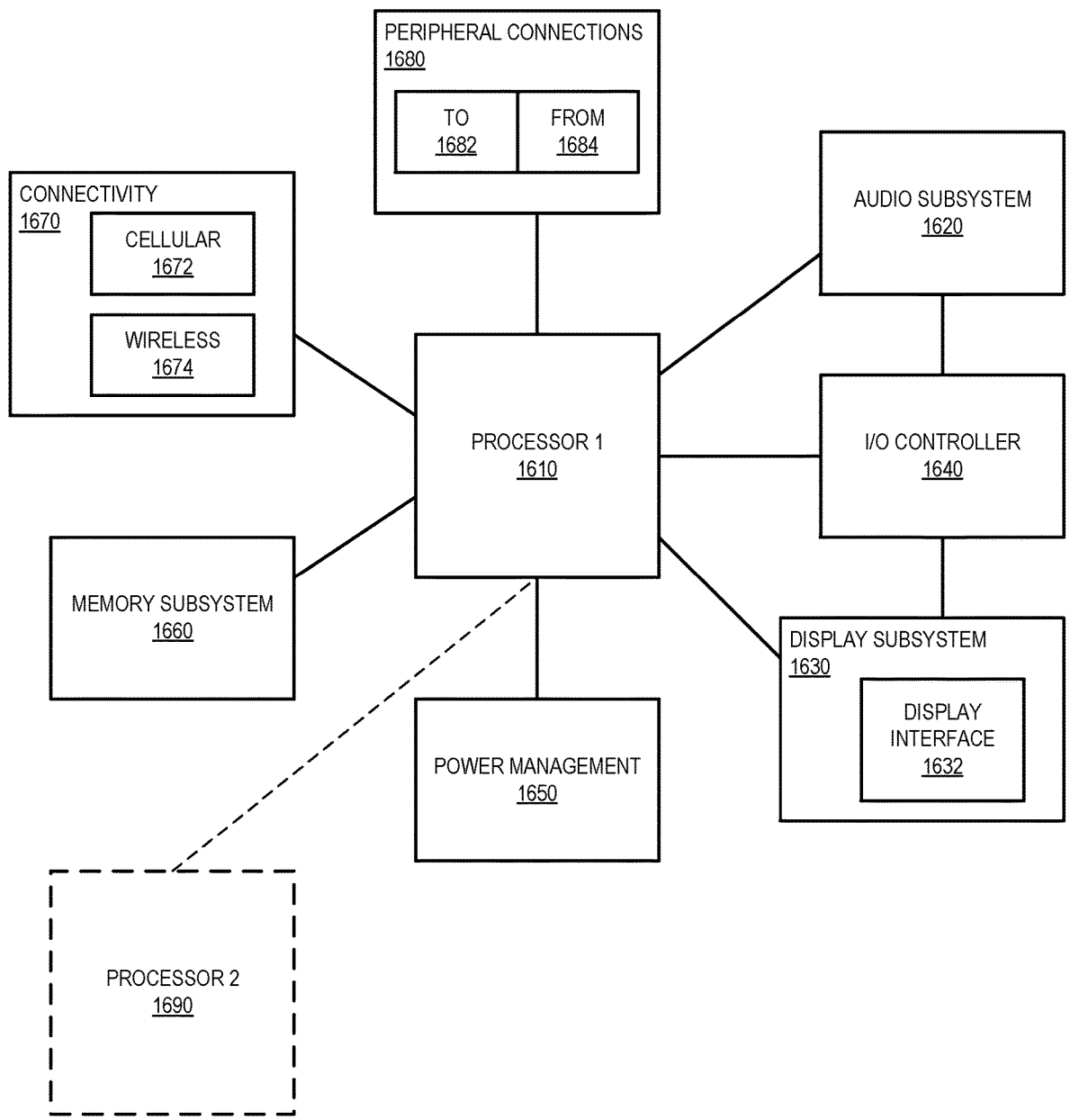
FIG. 12 illustrates a smart device or a computer system or a SoC (System-on-Chip) having an apparatus to improve FUSA, according to some embodiments of the disclosure.

FIG. 12 illustrates a smart device or a computer system or a SoC (System-on-Chip) having an apparatus to improve FUSA, according to some embodiments of the disclosure. FIG. 12 illustrates a block diagram of an embodiment of a mobile device in which flat surface interface connectors could be used. In some embodiments, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In some embodiments, computing device 1600 includes first processor 1610 having an apparatus to improve FUSA, according to some embodiments discussed. Other blocks of the computing device 1600 may also include an apparatus to improve FUSA, according to some embodiments. The various embodiments of the present disclosure may also comprise a network interface within 1670 such as a wireless interface so that a system embodiment may be incorporated into a wireless device, for example, cell phone or personal digital assistant.

In some embodiments, processor 1610 (and/or processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In some embodiments, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600 or connected to the computing device 1600. In one embodiment, a user interacts with the computing device 1600 by providing audio commands that are received and processed by processor 1610.

In some embodiments, computing device 1600 comprises display subsystem 1630. Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

In some embodiments, computing device 1600 comprises I/O controller 1640. I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In some embodiments, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In some embodiments, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, computing device 1600 comprises connectivity 1670. Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular and can include personal area networks (such as Bluetooth, Near Field, etc.), local area networks (such as Wi-Fi), and/or wide area networks (such as WiMax), or other wireless communication.

In some embodiments, computing device 1600 comprises peripheral connections 1680. Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A chip comprising:
    a circuit to monitor a voltage and/or an external clock which are external to the chip, wherein the circuit comprises an oscillator to generate a clock to monitor and/or sample the external clock; and
    one or more controllers to receive a report indicative of one or more errors with the voltage and/or a clocking parameter associated with the external clock, wherein the one or more controllers is to change a divider ratio if a frequency of the external clock changes compared to a threshold, and the threshold is programmable.

2. The chip of claim 1, wherein the oscillator comprises an inductor-capacitor (LC) oscillator.

3. The chip of claim 1, further comprising:
    a voltage reference generator to generate a reference voltage for the circuit; and
    a voltage regulator to generate a supply voltage for the circuit.

4. The chip of claim 1, wherein the circuit is to assert an enable signal in response to a rising or falling edge of the external clock, and a counter is to begin counting in response to the enable signal.

5. The chip of claim 1, wherein the divider ratio is of a divider of a phase-locked loop.

6. The chip of claim 1, wherein the divider ratio is an integer ratio or fractional dividing ratio.

7. The chip of claim 1, wherein the circuit is to monitor the voltage and/or external clock prior to at least one of boot or fuse download.

8. The chip of claim 4, wherein the counter is to operate on a clock different and separate from the external clock, and the counter is to determine the frequency of the external clock.

9. The chip of claim 4, further comprising a comparator to compare an output of the counter with a reference.

10. The chip of claim 5, further comprising a delta-sigma modulator to provide the divider ratio to the divider.

11. A system comprising:
    a clock generator to generate a first clock; and
    a processor coupled to the clock generator, wherein the processor includes:
        a circuit to monitor an external clock which is external to the system, wherein the circuit comprises an oscillator to generate a clock to monitor and/or sample the external clock; and
        one or more controllers to receive a report that a frequency of the external clock, has changed compared to a threshold, and to change a divider ratio in response to the report, wherein the threshold is programmable.

12. The system of claim 11, wherein the oscillator comprises an inductor-capacitor (LC) oscillator.

13. The system of claim 11, wherein the processor comprises:
    a voltage reference generator to generate a reference voltage for the circuit; and
    a voltage regulator to generate a supply voltage for the circuit.

14. The system of claim 11, wherein the circuit is to monitor a rising or falling edge of the external clock and then to enable a counter to begin counting.

15. The system of claim 11, wherein the circuit is to monitor the external clock prior to at least one of boot or fuse download.

16. The system of claim 14, wherein the counter is to operate on a clock different and separate from the external clock, and the counter is to determine the frequency of the external clock.

17. The system of claim 14, further comprising a comparator to compare an output of the counter with a reference.

18. An apparatus, comprising:
a circuit to monitor an external power supply voltage, wherein the circuit comprises a voltage divider to divide the power supply voltage to a divided down version of the power supply voltage, a first comparator to compare the divided down version of the power supply voltage to a maximum threshold voltage, and a second comparator to compare the divided down version of the power supply voltage to a minimum threshold voltage, wherein the first and second comparators each comprise a multibit comparator tree; and
one or more controllers to receive a report from the circuit, the report indicates the divided down version of the power supply voltage is above the maximum threshold voltage or below the minimum threshold voltage.

19. The apparatus of claim 18, wherein:
the multibit comparator tree comprises multiple stages; and
a first stage of the multiple stages comprises a NAND gate and a NOR gate to compare bits of one binary word to corresponding bits of another binary word.

20. The apparatus of claim 18, wherein the first stage is followed by stages which each include complex logic and an AND gate.

21. The apparatus of claim 18, wherein the circuit is to monitor the external power supply voltage prior to at least one of boot or fuse download.

* * * * *